United States Patent
Singhal et al.

(10) Patent No.: US 11,150,998 B2
(45) Date of Patent: Oct. 19, 2021

(54) REDEFINING BACKUP SLOS FOR EFFECTIVE RESTORE

(71) Applicant: EMC IP Holding Company LLC, Hopkinton, MA (US)

(72) Inventors: Upanshu Singhal, Bangalore (IN); Sairam Veeraswamy, Coimbatore (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 16/024,278

(22) Filed: Jun. 29, 2018

(65) Prior Publication Data

US 2020/0004641 A1 Jan. 2, 2020

(51) Int. Cl.
*G06F 12/00* (2006.01)
*G06F 11/14* (2006.01)
*G06F 9/455* (2018.01)

(52) U.S. Cl.
CPC ...... *G06F 11/1461* (2013.01); *G06F 11/1423* (2013.01); *G06F 11/1428* (2013.01); *G06F 11/1456* (2013.01); *G06F 11/1464* (2013.01); *G06F 9/45558* (2013.01)

(58) Field of Classification Search
CPC ...................................................... G06F 11/14
USPC ........................................................ 711/162
See application file for complete search history.

(56) References Cited

U.S. PATENT DOCUMENTS

| | | | | |
|---|---|---|---|---|
| 8,819,362 B1* | 8/2014 | Duprey | ............... | G06F 11/2082 711/162 |
| 9,424,152 B1* | 8/2016 | Raut | ................... | G06F 11/2041 |
| 9,977,704 B1* | 5/2018 | Chopra | ............... | G06F 11/1464 |
| 10,042,710 B2* | 8/2018 | Mutalik | ............... | G06F 11/1451 |
| 10,810,088 B1* | 10/2020 | Gu | ...................... | G06F 11/1464 |
| 2004/0236800 A1* | 11/2004 | Elkady | ................... | H04L 41/00 |
| 2012/0117029 A1* | 5/2012 | Gold | .................. | G06F 11/1451 707/651 |
| 2012/0331248 A1* | 12/2012 | Kono | ................... | G06F 11/1458 711/162 |
| 2015/0046230 A1* | 2/2015 | Laksman | ......... | G06Q 10/06393 705/7.39 |
| 2015/0193325 A1* | 7/2015 | Harsan-Farr | ........ | G06F 11/3409 702/186 |
| 2015/0236916 A1* | 8/2015 | Spurlock | ............. | H04L 41/0856 709/203 |
| 2016/0054946 A1* | 2/2016 | Martinez Lerin | ..... | G06F 3/0619 711/154 |
| 2017/0235507 A1* | 8/2017 | Sinha | ..................... | G06F 21/78 711/114 |
| 2017/0262185 A1* | 9/2017 | Long | ..................... | G06F 3/0605 |
| 2018/0181769 A1* | 6/2018 | Vora | .................... | H04L 67/1097 |
| 2018/0189146 A1* | 7/2018 | Banasik | .............. | G06F 11/1458 |
| 2020/0004641 A1* | 1/2020 | Singhal | .............. | G06F 11/1461 |

* cited by examiner

Primary Examiner — Mohamed M Gebril
(74) Attorney, Agent, or Firm — Womble Bond Dickinson (US) LLP

(57) ABSTRACT

Disclosed is a method, apparatus, and system for dynamically changing a backup policy, the operations comprising: automatically detecting a change in a backup source system; automatically activating a new backup policy, wherein the new backup policy is determined based on the change in the backup source system and an old backup policy; and performing a backup session based on the new backup policy.

20 Claims, 3 Drawing Sheets

100

REDEFINING BACKUP SLOS FOR EFFECTIVE RESTORE

FIELD OF THE INVENTION

Embodiments of the disclosure relate to data backup, and in particular, to dynamically updating a backup policy.

BACKGROUND

Data backup software policies and their service levels are designed to backup application data, file system data, virtual machines, hypervisors, etc. The data backup software policies define the backup workflows for each backup and, therefore, control the quality of backup service (QOBS) provided to each backup, e.g., application data, file system data, etc. However, customers are only concerned with the effectiveness of the backup from the perspective of how quickly customer facing services can be brought back up and running via a restore using the previously stored data backups.

BRIEF DESCRIPTION OF THE DRAWINGS

Embodiments of the disclosure are illustrated by way of example and not limitation in the Figures of the accompanying drawings in which like references indicate similar elements.

DETAILED DESCRIPTION

Figure 1:
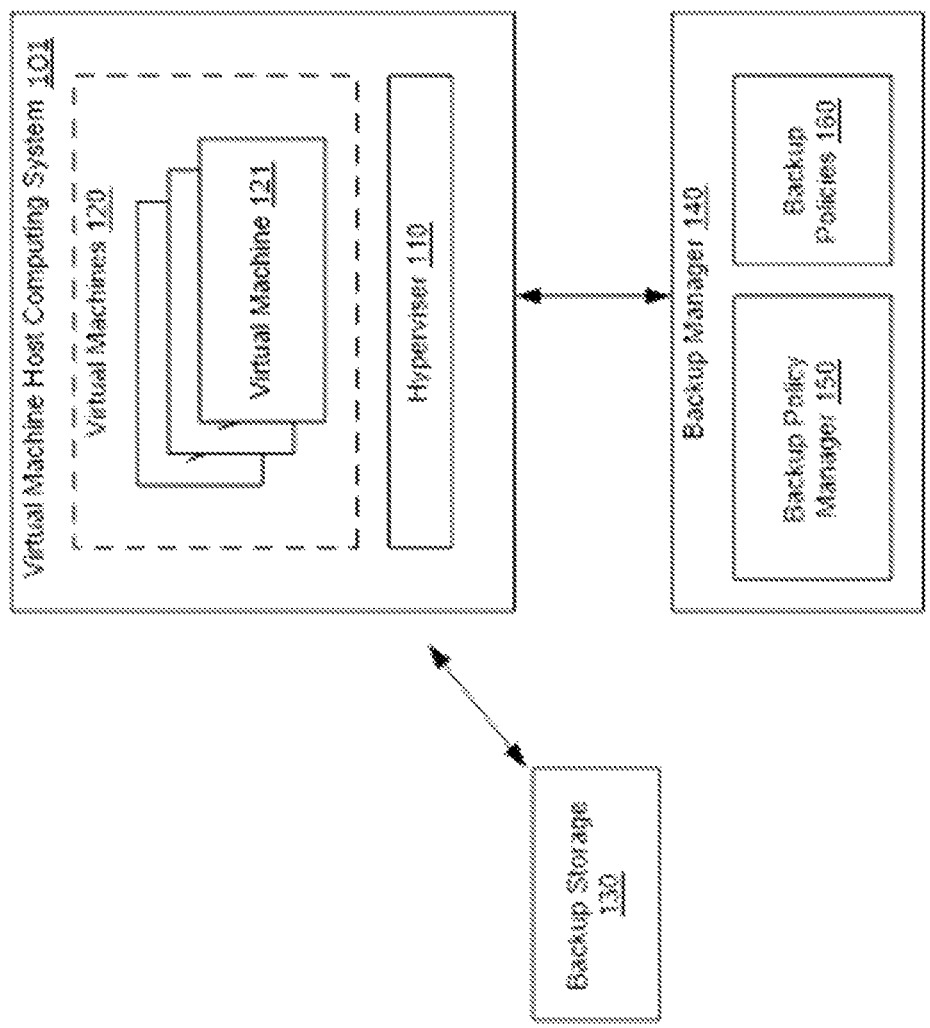
FIG. 1 is a block diagram illustrating an example environment in which embodiments of the disclosure may be practiced.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Embodiments of the disclosure related to methods and systems for dynamically modifying the data backup software policies in response to changes in client use scenarios and underlying hardware characteristics, to ensure the provided QOBS meets client concerns. Specifically, the methods and systems ensure that data backup software policies are appropriately tailored to meet customer expectations.

Most of the backup services drive backup and/or restore as a sequential, static process. In other words, storage/restore policies are set and then are static. Generally, restorations of backup data are performed using independent streams. While doing so, multiple streams contend for limited computing resources of the system such as, processor cycles, storage input/output operations per second (TOPS), and/or inter-device communication bandwidth.

In a conventional implementation, methods and tools do not balance the available computing resources with the number of concurrent restoration sessions. Rather, the conventional implementation of a backup system simply adopts a throttling schema to limit overall system level computing resource consumption.

This conventional approach is driven from the point of view of bounding the consumption of computing resources consumed by the backup application.

The conventional approach is associated with a number of problems. For example, backup policies are created based on mission critical data. Backup policies are created keeping in view the type of data customer is going to backup. Protection software spells out different type of backup policies, e.g., Platinum or Gold, and these policies are created keeping in view the primary storage, protection storage or the type of application and where it is hosting its data.

For example, ORACLE application is a mission critical application and hosted on a high performance storage array. Its data protection is scheduled on a frequent basis using disk based de-duplicated protection storage which gives a very high performance on backup and meets customer's recovery point objectives (RPOs). However, the data backup software policies set based only on data criticality considerations do not meet restore goals. In addition to ensuring data is properly backed up, the data must also be available to perform a restoration within reasonable periods of time. In practice, data backup software policies set based only on the criticality of data cannot meet customer RTOs or service-level agreements (SLAs) depending on the methods used to restore.

Further, with the conventional approach, backup policies are pre-determined by application administrators. An application administrator defines the backup policies based on their experience with the application, the amount of application data, and application usage scenarios. These policies run are static in that the same backup workflow is performed indefinitely regardless of changes in data load, changes in underlying characteristics of the physical system, changes in usage patterns by users etc. Such static policies leads to data protection failures because the policies are unable to keep up with changes in, for example, data load or client usage patterns. In such scenarios, a backup does not complete in the defined backup window and result in a backup failure. Accordingly, data is left unprotected during periods of time during which backup failures occur and, in turn, eventually lead to failures to meet customer's RPOs for these time periods.

Moreover, with the conventional approach, a backup policy is sequential in nature such that backup is started on a defined schedule. A backup session configured for a backup copy off-premise or for long term storage will start only once the primary backup gets completed. Or the backup copy will be made on a different schedule.

For mission critical data, in a case where the primary storage and protection storage go offline, data can still be available due to inbuilt high-availability (HA) capacity with the primary storage. However, a disruption of data protection can still result, leading to unavailability of backup data necessary to perform a recovery.

In addition, with the conventional approach, restore performance is low in comparison to backup performance. In a data protection environment, data protection is configured for the maximum performance so that it gets completed in the given backup window. Data protection could be creating copies of data, offloading the data backup from production servers to proxy servers, and/or separating high bandwidth networks between production software and protection storage.

Additionally, with the conventional approach, restore performance, policies, and sequences are not taken care of in the backup service level objective (SLO) definition. Restores can be multi-streamed, high throttle rate back to production servers but still not meet customer SLOs. This is because restore network may not have the same bandwidth as data protection bandwidth: it could share the same network channel as the normal network channel rather using the protection channel.

In contrast, embodiments disclosed herein attempt to balance the restore performance needs with the available resources and the effective application service level. The systems and methods according to embodiments of the disclosure include the following features. 1) They implement dynamic modification of data backup software policies based on the conditions imposed on the system by a user and/or changes in characteristics in the underlying hardware of the system. 2) They consider the cohesive end to end result of the data backup software policies on the user experience while defining the SLO for backup. 3) Given the SLO needs, they provide a comprehensive ecosystem capacity analysis on their ability to meet the SLO when it comes to enabling applications services back online—i.e., a) for a given application, what does restoring the data (with specific RPO expectations, which is also tied to SLO) involve in terms of effective bandwidth and compute, and network and storage capacity, and b) given the level of contention, what is the effective skew in restoring the necessary data to bring the application service back online to ensure that the client expectations are met.

Therefore, embodiments of the disclosure relate to new methods, systems, and tools for ensuring that restorations of computing devices/applications can be performed in a way that satisfies client expectations. In particular, the new methods and system include dynamically modified data backup software policies that ensure backups are generated. The data backup software policies may be modified based on: 1) changes in usage patterns by users, and/or 2) changes in characteristics of the hardware of the clients.

By dynamically modifying the data backup software policies, the system may ensure that backups are generated so that subsequent restorations can be performed.

Referring to FIG. 1, a block diagram illustrating an example environment 100 in which embodiments of the disclosure may be practiced is shown. The environment 100 includes any number of virtual machines 120 hosted by a host computing system 101. The virtual machines 120 execute using computing resources of the host computing system 101.

To backup the virtual machines 120, backups are stored in a backup storage 130. Backups are generated and stored in the backup storage 130 based on backup policies 160.

A backup manager 140 may initiate the backups in accordance with the backup policies 160. In other words, the backup manager 140 may select a frequency of backup generation, a backup window for the backup generation, a storage location of the generated backups, and/or set other parameters regarding the generation and storage of backups.

To ensure that backups are generated, the backup manager includes a backup policy manager 150 that dynamically modifies the backup policies 160. The backup policy manager 150 may modify any of the backup policies 160 associated with any of the virtual machines in response to changing conditions.

The changing conditions may be, for example, an increase or decrease in a usage pattern of a virtual machine by a user. For example, a user may dramatically increase the transaction rate of an application executing on a virtual machine. In such a scenario, a much larger quantity of data may be required to be stored in the backup storage 130 as part of a backup procedure. If a backup policy associated with the virtual machine does not have a backup window of sufficient duration, the backup generation may fail because it may not be stored in the backup storage 130 within the static window. In such a scenario, the virtual machine would be at risk of data loss due to the backup failure.

To prevent such a failure scenario from occurring, the backup policy manager 150 may continuously monitor the performance of backups and compare the performance of the backups to the backup conditions specified by the backup policies 160. If the actual backups are approaching limits imposed by the backup policies 160, the backup policy manager 150 may modify the backup policies 160 to ensure that the static backup policies do not cause a backup failure. In this case, the backup policy manager 150 may, for example: (i) change a storage location to a backup storage that has a higher bandwidth to ensure that the generated backup is stored within the backup window, (ii) increase a duration of the backup window, or (iii) change a start/stop of the backup window to coincide with a period of time where additional computing resources of the host computing system 101 are available to ensure that the backup is generated and stored in the back storage 130.

In another example, the changing conditions may be, for example, degradation of a disk of the host computing device 101 used by a virtual machine (e.g., 121) to store data. As a disk such as, for example, a solid state drive degrades, the risk of catastrophic data loss increases. For example, a solid state drive may apply progressively more aggressive read voltages to cells and/or wear leveling strategies as degradation of the disk occurs.

In such a scenario, the backup policy manager 150 may modify the backup policies 160 associated with the virtual machines 121 to generate backups at progressively higher frequency as the condition of the disk of the host computing system 101 degrades. To ensure that the backups are stored, the backup policy manager 150 may also change a storage location of the generated backups to a higher performance backup storage to reduce the likelihood that generated backups are not lost due to a failure on the storage of the host computing system 101 before the generated backup is stored in a backup storage.

In a further example, the changing conditions may be, for example, a replacement of an existing disk of the host computing device 101 with a higher performance disk by a virtual machine (e.g., 121) to store data. In such a scenario, the backup policy manager 150 may modify the backup policies 160 associated with the virtual machines 121 to store generated backups in higher performance backup storages 130. Doing so may ensure that the virtual machines 121 can be restored in the minimum amount of time, i.e., matching the throughput of the backup storage to the improved computing capabilities of the host computing system 101.

Figure 2:
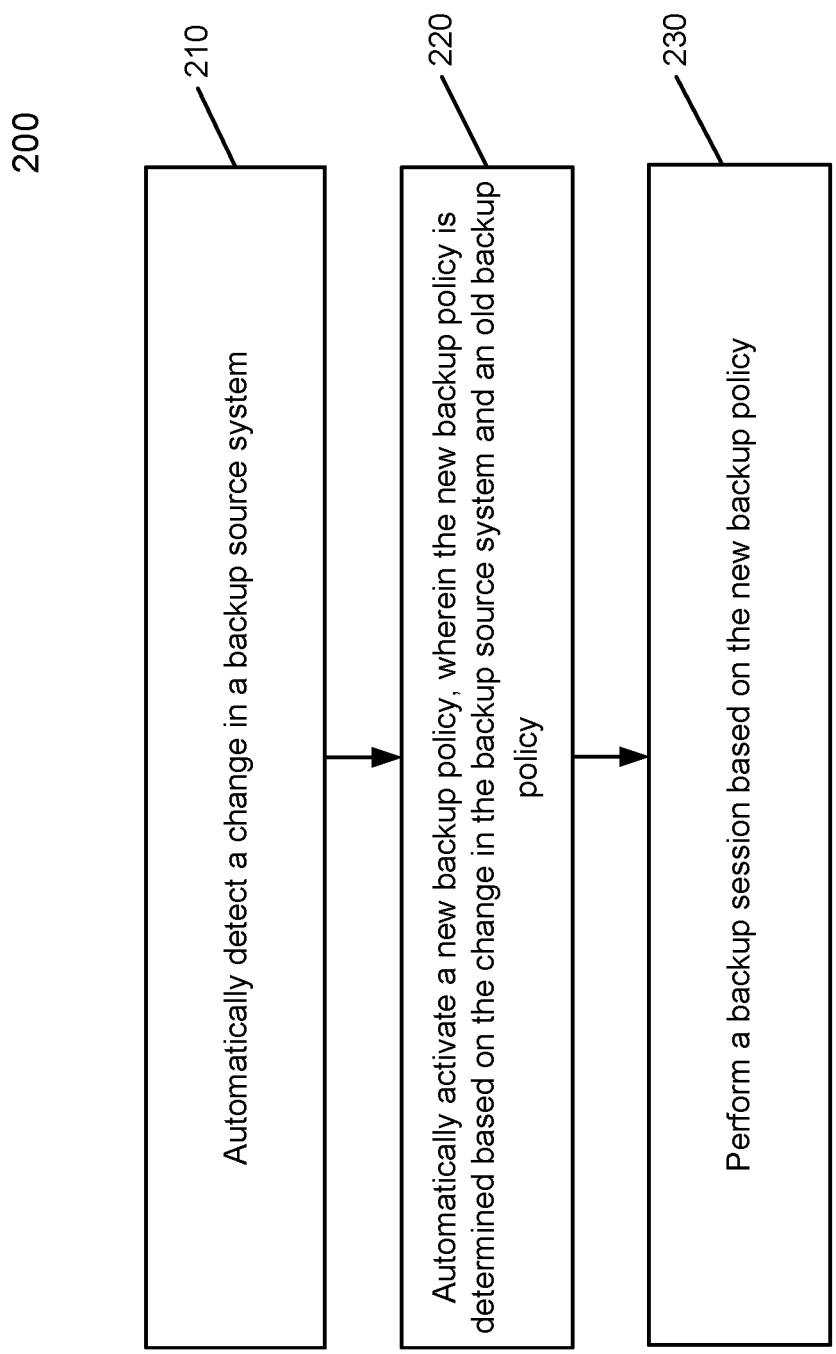
FIG. 2 is a flowchart illustrating an example method for dynamically changing a backup policy, according to one embodiment of the disclosure.

Referring to FIG. 2, a flowchart illustrating an example method 200 for dynamically changing a backup policy, according to one embodiment of the disclosure, is shown. At block 210, a change in a backup source system may be automatically detected. At block 220, a new backup policy may be automatically activated, wherein the new backup policy is determined based on the change in the backup source system and an old backup policy. Activating a new backup policy may comprise one of: changing a backup frequency, changing a backup storage location, changing a backup window duration, or changing a start/stop time of a backup window. At block 230, a backup session may be performed based on the new backup policy.

Note that some or all of the components and operations as shown and described above (e.g., operations of method 200 illustrated in FIG. 2) may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Therefore, according to embodiments of the disclosure, backup policies may be dynamically updated to meet client-focused backup and restoration goals. The system provides a dynamic data protection policy that adapts to meet client focused restoration goals. For example, when a client specifies a restoration policy upon initial configuration, the client is communicating a restoration goal. The system dynamically modifies the data protection policies as, for example, the underlying hardware of host computing devices changes to ensure that the client communicated goal is achieved after the changes. In contrast, the static data backup software policies used in conventional systems do not meet clients goals after hardware changes because the policies do not reflect the intent of the client, only the configuration setting initially chosen by a user.

Figure 3:
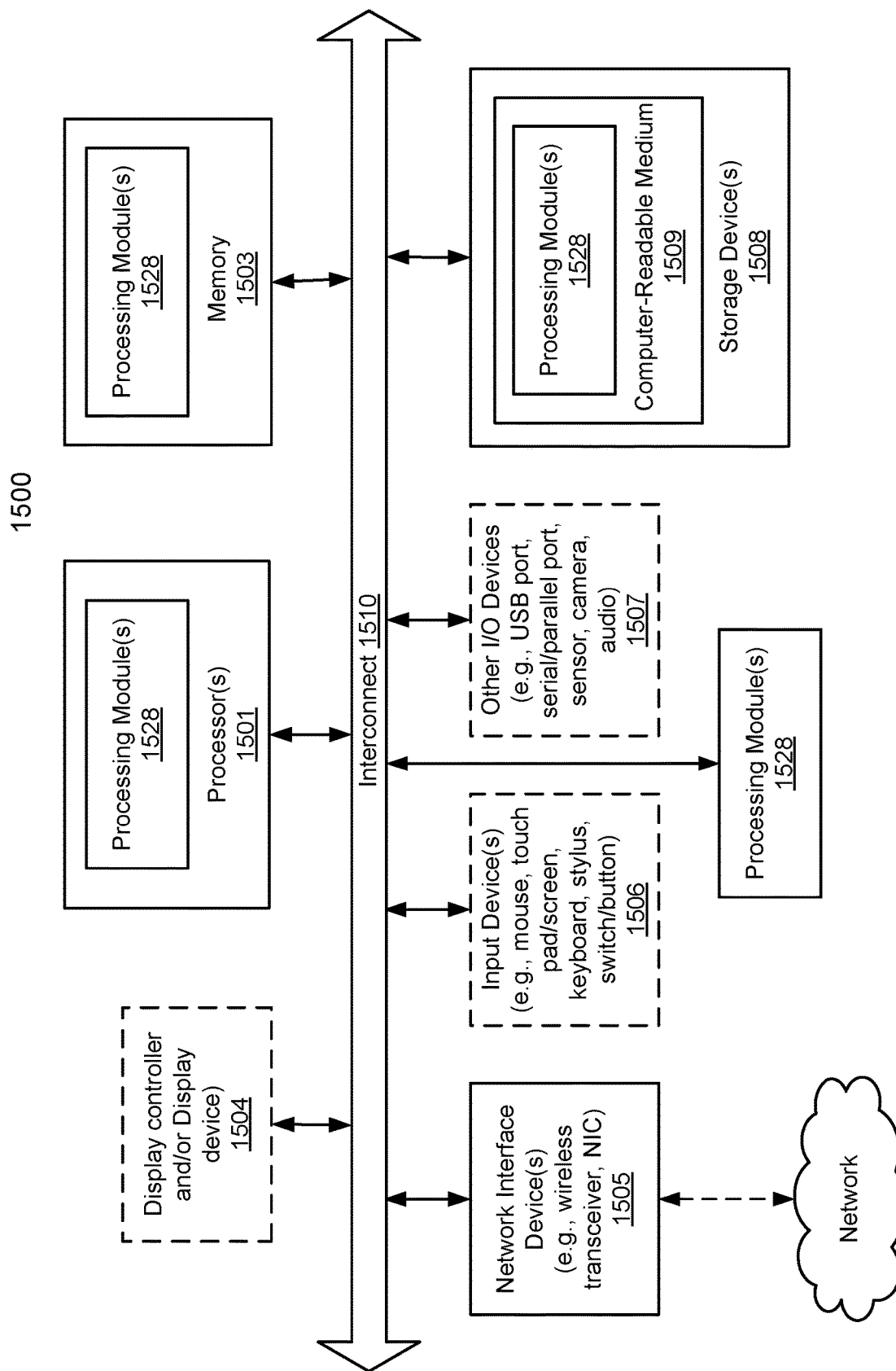
FIG. 3 is a block diagram illustrating an example of a data processing system which may be used with one embodiment of the invention.

FIG. 3 is a block diagram illustrating an example of a data processing system which may be used with one embodiment of the invention. For example, system 1500 may represent any of data processing systems described above performing any of the processes or methods described above. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., processing module, unit, and/or logic 1528) embodying any one or more of the methodologies or functions described herein. Processing module/unit/logic 1528 may represent any of the components described above, such as, for example, backup history module 123, snapshot generation module 203, a deduplication logic or a backup engine, as described above. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding Figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for dynamically changing a backup policy, the method comprising:
   automatically detecting a change in a backup source system, wherein the change in the backup source system comprises a change in usage patterns by users and a change in characteristics of an underlying hardware of the backup source system;
   automatically determining whether an old backup policy in combination with the change in the backup source system would lead to a failure in fulfillment of a backup service level objective;
   in response to determining that the old backup policy in combination with the change in the backup source system would lead to a failure in fulfillment of the backup service level objective, automatically determining a new backup policy based on the change in the backup source system, the old backup policy, and the backup service level objective, wherein the new backup policy in combination with the change in the backup source system leads to a fulfillment of the backup service level objective, wherein determining the new backup policy comprises changing a backup storage location to a higher performance location in response to an increase in storage performance in the backup source system, changing a duration of a backup window, and changing a start time of the backup window and a stop time of the backup window to coincide with a period of time where additional computing resources of the backup source system are available;
   automatically activating the new backup policy, including increasing a backup frequency in response to an increase in voltage used by a solid state drive in the backup source system to store data; and
   performing a backup session based on the new backup policy.

2. The method of claim 1, wherein the backup source system comprises a virtual machine running on a hardware host.

3. A non-transitory machine-readable medium having instructions stored therein, which when executed by a processor, cause the processor to perform operations for dynamically changing a backup policy, the operations comprising:
   automatically detecting a change in a backup source system, wherein the change in the backup source system comprises a change in usage patterns by users and a change in characteristics of an underlying hardware of the backup source system;
   automatically determining whether an old backup policy in combination with the change in the backup source system would lead to a failure in fulfillment of a backup service level objective
   in response to determining that the old backup policy in combination with the change in the backup source system would lead to a failure in fulfillment of the backup service level objective, automatically determining a new backup policy based on the change in the backup source system, the old backup policy, and the backup service level objective, wherein the new backup policy in combination with the change in the backup source system leads to a fulfillment of the backup service level objective, wherein determining the new backup policy comprises changing a backup storage location to a higher performance location in response to an increase in storage performance in the backup source system, changing a duration of a backup window, and changing a start time of the backup window and a stop time of the backup window to coincide with a period of time where additional computing resources of the backup source system are available;
   automatically activating the new backup policy, including increasing a backup frequency in response to an increase in voltage used by a solid state drive in the backup source system to store data; and
   performing a backup session based on the new backup policy.

4. The non-transitory machine-readable medium of claim 3, wherein the backup source system comprises a virtual machine running on a hardware host.

5. A data processing system, comprising:
   a processor; and
   a memory coupled to the processor to store instructions, which when executed by the processor, cause the processor to perform operations for dynamically changing a backup policy, the operations including:
   automatically detecting a change in a backup source system, wherein the change in the backup source system comprises a change in usage patterns by users and a change in characteristics of an underlying hardware of the backup source system;
   automatically determining whether an old backup policy in combination with the change in the backup source system would lead to a failure in fulfillment of a backup service level objective
   in response to determining that the old backup policy in combination with the change in the backup source system would lead to a failure in fulfillment of the backup service level objective, automatically determining a new backup policy based on the change in the backup source system, the old backup policy, and the backup service level objective, wherein the new backup policy in combination with the change in the backup source system leads to a fulfillment of the backup service level objective, wherein determining the new backup policy comprises changing a backup storage location to a higher performance location in response to an increase in storage performance in the backup source system, changing a duration of a backup window, and changing a start time of the backup window and a stop time of the backup window to coincide with a period of time where additional computing resources of the backup source system are available;

automatically activating the new backup policy, including increasing a backup frequency in response to an increase in voltage used by a solid state drive in the backup source system to store data; and performing a backup session based on the new backup policy.

6. The data processing system of claim 5, wherein the backup source system comprises a virtual machine running on a hardware host.

7. The method of claim 1, wherein the backup service level objective is based on a restoration policy.

8. The method of claim 7, wherein the restoration policy is provided by a client.

9. The method of claim 8, wherein the restoration policy is used to obtain a restoration goal as a client communicated goal.

10. The method of claim 9, wherein the fulfillment of the backup service level objective achieves the client communicated goal.

11. The method of claim 8, wherein the restoration policy does not reflect an intent of the client after the change in the backup source system occurs.

12. The non-transitory machine-readable medium of claim 3, wherein the backup service level objective is based on a restoration policy.

13. The non-transitory machine-readable medium of claim 12, wherein the restoration policy is provided by a client.

14. The non-transitory machine-readable medium of claim 13, wherein the restoration policy is used to obtain a restoration goal as a client communicated goal.

15. The non-transitory machine-readable medium of claim 14, wherein the fulfillment of the backup service level objective achieves the client communicated goal.

16. The non-transitory machine-readable medium of claim 13, wherein the restoration policy does not reflect an intent of the client after the change in the backup source system occurs.

17. The data processing system of claim 5, wherein the backup service level objective is based on a restoration policy.

18. The data processing system of claim 17, wherein the restoration policy is provided by a client.

19. The data processing system of claim 18, wherein the restoration policy is used to obtain a restoration goal as a client communicated goal.

20. The data processing system of claim 19, wherein the fulfillment of the backup service level objective achieves the client communicated goal.

* * * * *